(12) United States Patent
Jang et al.

(10) Patent No.: US 9,306,226 B2
(45) Date of Patent: Apr. 5, 2016

(54) FUEL CELL WITH POROUS MATERIAL-GASKET INTEGRATED STRUCTURE

(71) Applicant: Hyundai Motor Company, Seoul (KR)

(72) Inventors: Jun Ho Jang, Gyeonggi-do (KR); Yoo Chang Yang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 378 days.

(21) Appl. No.: 13/897,774

(22) Filed: May 20, 2013

(65) Prior Publication Data
US 2014/0178785 A1    Jun. 26, 2014

(30) Foreign Application Priority Data
Dec. 24, 2012  (KR) .................. 10-2012-0151909

(51) Int. Cl.
*H01M 8/04*      (2006.01)
*H01M 8/02*      (2006.01)
*H01M 8/10*      (2006.01)
*H01M 8/24*      (2006.01)

(52) U.S. Cl.
CPC .......... *H01M 8/0258* (2013.01); *H01M 8/0247* (2013.01); *H01M 8/04007* (2013.01); *H01M 8/1002* (2013.01); *H01M 8/241* (2013.01); *H01M 8/242* (2013.01); *H01M 2008/1095* (2013.01); *Y02E 60/50* (2013.01); *Y02E 60/521* (2013.01)

(58) Field of Classification Search
CPC   H01M 8/0258; H01M 8/04007; Y02E 60/50; Y02E 60/521
See application file for complete search history.

(56) References Cited

FOREIGN PATENT DOCUMENTS

| JP | 6-196177 | * | 7/1994 | ............. H01M 8/02 |
|----|----------|---|--------|----------------------|
| JP | 2009230877 A | | 10/2009 | |
| KR | 100953273 B1 | | 4/2010 | |
| KR | 10-2011-0059381 | | 6/2011 | |
| KR | 10-2012-0048056 | | 5/2012 | |
| KR | 10-2012-0078393 | | 7/2012 | |

* cited by examiner

*Primary Examiner* — Raymond Alejandro
(74) *Attorney, Agent, or Firm* — Mintz Levin Cohn Ferris Glovsky and Popeo, P.C.; Peter F. Corless

(57) ABSTRACT

Disclosed is a fuel cell with a porous material-gasket integrated structure, which can facilitate the flow of gas and water by stacking a porous material-gasket integrated structure, in which a porous material and a gasket are integrally molded, on a separator. In particular, the present invention provides a fuel cell with a porous material-gasket integrated structure, in which a porous material and a gasket are integrally molded and stacked on a separator such that the porous material is located between a manifold, through which gas is supplied, and a reaction surface, where an electrochemical reaction takes place, so as to serve as a diffuser for gas fed through the manifold.

15 Claims, 6 Drawing Sheets

- Cross section of line A-A -

- Cross section of line B-B -

FUEL CELL WITH POROUS MATERIAL-GASKET INTEGRATED STRUCTURE

CROSS-REFERENCE TO RELATED APPLICATION

This application claims under 35 U.S.C. §119(a) the benefit of Korean Patent Application No. 10-2012-0151909 filed Dec. 24, 2012, the entire contents of which are incorporated herein by reference.

BACKGROUND (a) Technical Field

The present invention relates to a fuel cell with a porous material-gasket integrated structure. More particularly, the present invention relates to a fuel cell having a porous material-gasket integrated structure stacked on a separator, in which a porous material and a gasket are integrally molded. The thus formed structure facilitates the flow of gas and water through the fuel cell.

(b) Background Art

The configuration of a unit cell of a typical fuel cell stack will be described with reference to FIG. 8. A membrane electrolyte assembly (MEA) is positioned in the center of the unit cell. The membrane electrolyte assembly includes a polymer electrolyte membrane 10 capable of transporting hydrogen ions (protons), and catalyst layers such as a cathode 12 and an anode 14. The catalyst layers are coated on both sides of the electrolyte membrane 10 such that hydrogen and oxygen react with each other.

As shown, a gas diffusion layer (GDL) 16 is stacked on the outside of each of the cathode 12 and the anode 14. A separator 20, in which flow fields are formed to supply fuel and discharge water produced by a reaction, is stacked between the gas diffusion layer 16 and a gasket 18, and an end plate 30 for supporting and fixing the above-described components is connected to the outermost side end.

Accordingly, at the anode 14 of the fuel cell stack, an oxidation reaction of hydrogen occurs to produce hydrogen ions (protons) and electrons, and the produced hydrogen ions and electrons are transmitted to the cathode 12 through the electrolyte membrane 10 and the separator 20. At the cathode 12, the hydrogen ions and electrons transmitted from the anode 14 react with the oxygen-containing air to produce water. At the same time, electrical energy is generated by the flow of electrons, and the electrical energy is supplied to a load requiring the energy through a current collector connected to the end plate 30.

In the above-described fuel cell, water that is produced is not smoothly discharged on a reaction surface of the separator 20, which is in contact with the anode 14 and the cathode 12, respectively. As a result, a flooding phenomenon occurs and, at the same time, the flow fields of the separator 20 are clogged, which are very problematic.

One proposed method for addressing these drawbacks is shown in FIG. 7, in which a fuel cell is provided with a separate porous material 40 interposed between a membrane electrode assembly 50 and a separator 20 to facilitate the flow of gas and water.

However, the porous material 40 is separately applied over a flow region of a fuel, i.e., a region between the anode and the separator and a region between the cathode and the separator. While the porous material 40 serves as a flow field, it increases the number of layers that constitute the fuel cell, thus increasing the length and thickness of the fuel cell stack.

Moreover, since the porous material 40 is separately applied over a wide range of reaction regions, the heat transfer efficiency for transferring heat to the exterior of the fuel cell during heat dissipation is reduced. This can cause overheating of the fuel cell stack, thus deteriorating the performance of the fuel cell stack.

The above information disclosed in this Background section is only for enhancement of understanding of the background of the invention and therefore it may contain information that does not establish a prior art that is already known in this country to a person of ordinary skill in the art.

SUMMARY OF THE DISCLOSURE

The present invention provides a fuel cell with a porous material-gasket integrated structure, which can facilitate the flow of gas and water. More particularly, the present invention provides a fuel cell in which a porous material-gasket integrated structure, in which a porous material and a gasket are integrally molded, is stacked on a separator such that the porous material is located between a manifold, through which gas is supplied, and a reaction surface, where an electrochemical reaction takes place. As such, the porous material-gasket integrated structure serves as a diffuser for gas fed through the manifold.

In one aspect, the present invention provides a fuel cell with a porous material-gasket integrated structure, the fuel cell including: a porous material-gasket integrated structure including a thin frame having a plurality of manifolds formed on both sides thereof, a porous material integrally molded in a position adjacent to the manifolds of the thin frame, and a gasket integrally molded on the thin frame; and a separator including a porous material-receiving portion in which the porous material-gasket integrated structure is stacked.

In an exemplary embodiment, the thin frame of the porous material-gasket integrated structure has a structure in which the plurality of manifolds are formed on both sides thereof and porous material support frames are integrally formed on the inside of the manifolds.

In another exemplary embodiment, the porous material of the porous material-gasket integrated structure is integrally molded adjacent to the inside of the manifolds of the thin frame.

In still another exemplary embodiment, the porous material of the porous material-gasket integrated structure is integrally formed to surround a manifold inner frame and the porous material support frames of the thin frame.

In yet another exemplary embodiment, a sealing material is integrally formed on upper and lower sides of the porous material and on outer surfaces other than the region in contact with one manifold selected from the plurality of manifolds.

In still yet another exemplary embodiment, the thin frame and the porous material are made of the same metal and are integrally molded.

In a further exemplary embodiment, the thin frame includes a plurality of through-holes for injection molding of the gasket.

In another further exemplary embodiment, the gasket is injection-molded to surround front and rear sides of the thin frame and has a predetermined thickness, and the gasket injection-molded on the front and rear sides of the thin frame is integrally connected thereto through the through-holes.

In still another further preferred embodiment, the separator has a structure in which a porous material-receiving portion is formed between the manifolds formed on both sides thereof and a reaction flow field formed through a central portion thereof.

In yet another further preferred embodiment, the reaction flow field in the porous material-receiving portion is formed as a straight flow field.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1A:
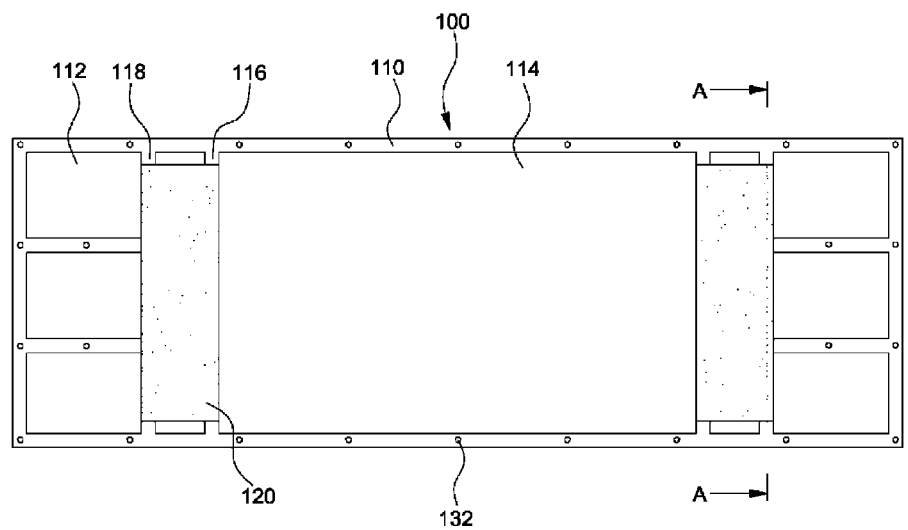
FIGS. 1A and 1B are a front view and a cross-sectional view showing that a porous material is integrally molded on a thin frame to implement a fuel cell with a porous material-gasket integrated structure according to an embodiment of the present invention.

Reference numerals set forth in the Drawings includes reference to the following elements as further discussed below:

| | |
|---|---|
| 100: porous material-gasket integrated structure | |
| 110: thin frame | 112: manifold |
| 114: reaction surface area | 116: porous material support frame |
| 118: manifold inner frame | 120: porous material |
| 122: sealing material | 130: gasket |
| 132: through-hole | 200: separator |
| 202: reaction flow field | 204: porous material-receiving portion |
| 206: manifold | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

The present invention provides a porous material-gasket integrated structure in which a porous material and a gasket are integrally molded and stacked between a separator and a membrane electrode assembly.

Figure 1B:
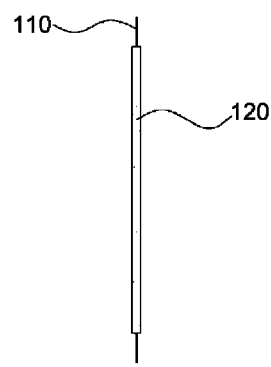
Figure 3:
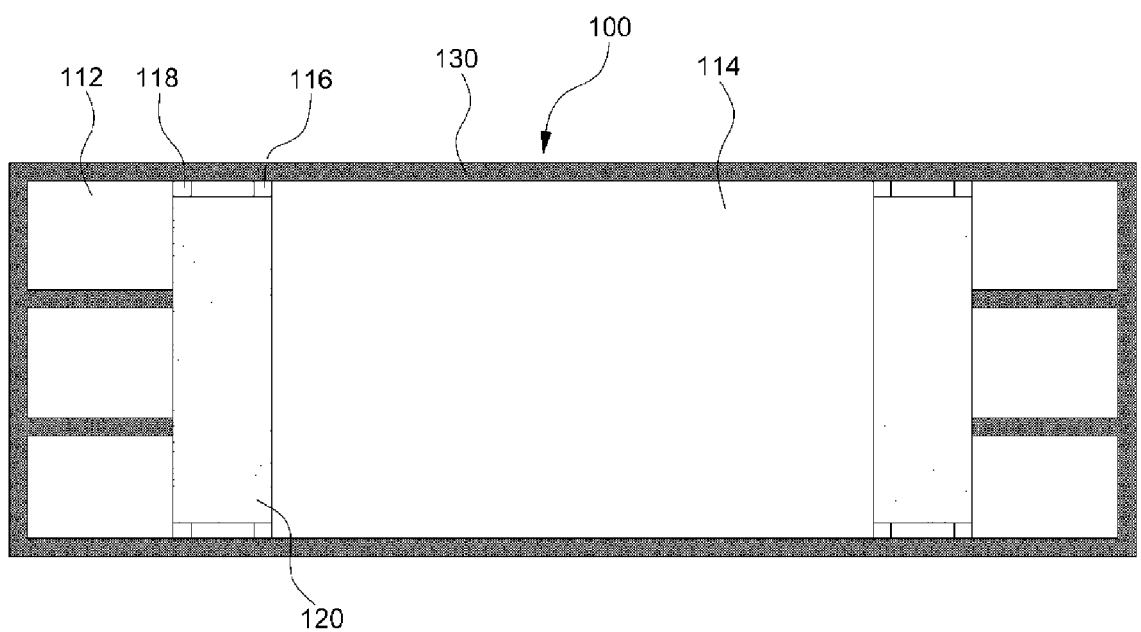
FIG. 3 is a front view showing a porous material-gasket integrated structure according to an embodiment of the present invention in which a porous material and a gasket are integrally molded on a thin frame.

Referring to FIGS. 1A and 1B, the porous material-gasket integrated structure 100 includes a thin frame 110, in which a plurality of manifolds 112 are formed, and a porous material 120 integrally molded in a position adjacent to the manifolds 112 of the thin frame 110. Further, as can be seen from FIG. 3, a gasket 130 integrally molded on the thin frame 110 on portions other than the porous material 120.

As shown, the thin frame 110 of the porous material-gasket integrated structure 100 can be shaped as a rectangular frame and includes a plurality of manifolds 112, such as hydrogen, coolant, and air manifolds. The thin frame 110 is formed on both sides of the structure and can be provided with a reaction surface area 114 having an open structure disposed in the middle thereof, such that a reaction flow field 202 of a separator 200 is exposed (e.g. see FIGS. 4-5).

Porous material support frames 116 can further be formed integrally on the inside of the manifolds 112 of the thin frame 110 arranged so as to extend up and down.

The thin frame 110 is smaller in thickness than the porous material 120 and generally has a thickness that provides rigidity sufficient to prevent deformation during injection molding with the gasket 130 or during handling.

The porous material 120 is preferably made of the same metal as the thin frame 110 and is integrally molded adjacent to the inside of the manifolds 112 of the thin frame 110 during the formation of the thin frame 110.

That is, the porous material 120 is integrally formed between the manifolds 112 of the thin frame 110 and the reaction surface area 114. This configuration is such that the reaction flow field 202 of the separator 200 is exposed when the separator 200 is subsequently stacked.

In particular, the porous material 120 is integrally formed to surround a manifold inner frame 118 and the porous material support frames 116 of the thin frame 110 such that the manifold inner frame 118 and the porous material support frames 116 are connected by the porous material 120. At the same time, the porous material 120 is filled/inserted between the manifold inner frame 118 and the porous material support frames 116.

Figure 2A:
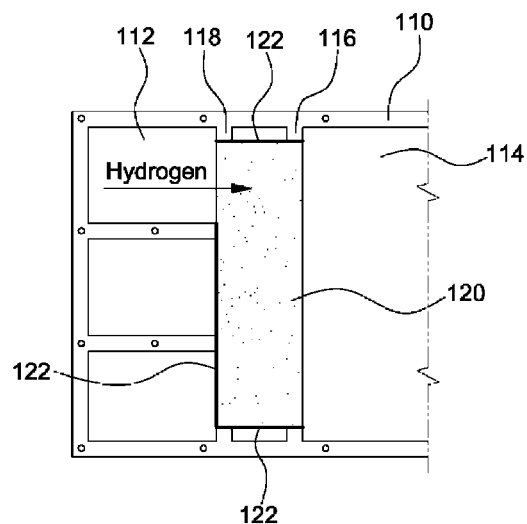
FIGS. 2A to 2C are front views showing that a sealing material is formed on a porous material of a porous material-gasket integrated structure according to an embodiment of the present invention.
Figure 2B:
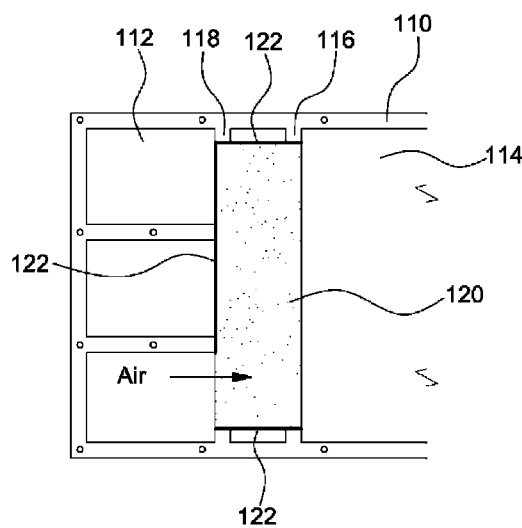
Figure 2C:
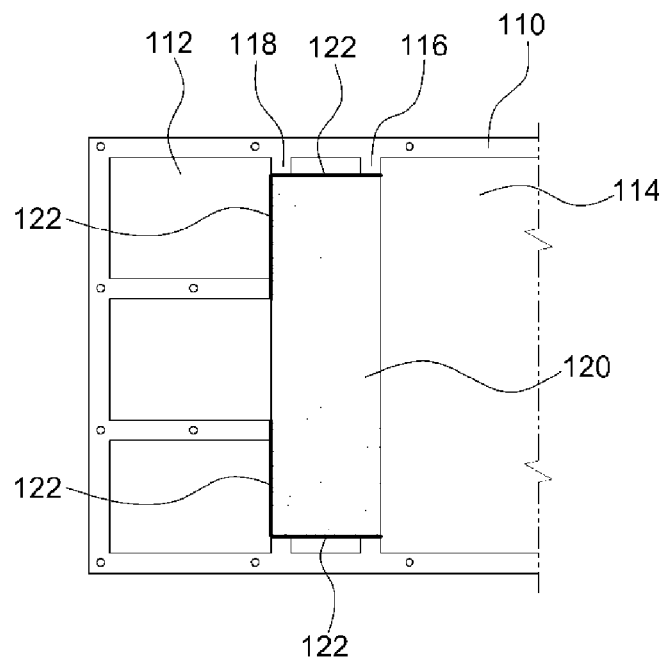

Preferably, as shown in FIGS. 2A to 2C, a sealing material 122 having a predetermined thickness is integrally formed on upper and lower sides of the porous material 120. The sealing material 122 can further be provided, as shown, on outer surfaces of the porous material 120 other than those portions that are in contact with one of the plurality of manifolds 112. As further shown in FIGS. 2A to 2C, the sealing material 122 may be absent from the side of the porous material 120 along the reaction surface area 114.

For example, as shown in FIG. 2A, the sealing material 122 is formed on the upper and lower sides of the porous material 120 and on the left outer surface other than that being in contact with a hydrogen manifold, through which hydrogen flows, such that only hydrogen can be fed into the porous material 120. As shown, the right outer surface of the porous material 120 along the reaction surface area 114 is further not provided with sealing material 122. Similarly, the sealing material 122 can be provided so as to allow only air (FIG. 2B) or coolant (FIG. 2C), etc. to be fed into the porous material 120 by the absence of sealing material 122 along the air manifold (FIG. 2B) or coolant manifold (FIG. 2C), respectively.

According to various embodiments, when the porous material 120 is integrally molded with the thin frame 110, the porous material 120 may be provided with a porous structure and the sealing material 122 may have a dense metallic plate structure without pores. The porous material 120 and the sealing material 122 may be integrally molded.

After the thin frame 110 and the porous material 120 are integrally molded in the above manner, the gasket 130 can be injection-molded integrally with the thin frame 110.

According to various embodiments, the gasket 130 is injection-molded in such a manner so as to surround the thin frame 110 in portions other than the porous material 120 (see FIG. 3), and a plurality of through-holes 132 (see FIG. 1A) can be formed at regular intervals in the thin frame 110 so as to prevent deformation of the thin frame 110, to facilitate the flow of the material for the gasket 130, and to prevent the occurrence of burrs during the injection molding of the gasket 130.

Of course, the number and size of the through-holes 132 can be adjusted to any suitable number and size depending on the flow characteristics of the material for the gasket 130 and the process conditions.

Accordingly, when the gasket 130 is injection-molded with the thin frame 110, the gasket 130 having a predetermined thickness surrounds the front and rear sides of the thin frame 110, and the gasket 130 is integrally connected thereto through the through-holes 132.

As such, the porous material-gasket integrated structure 100 of the present invention is configured such that the porous material 120, which is preferably made of the same metal as the thin frame 110, is integrally molded with the thin frame 110. Further, the gasket 130 is integrally injection-molded on the thin frame 110 without being integrally molded on the metallic porous material 120.

The porous material-gasket integrated structure 100 configured in the above manner can then be stacked between the membrane electrode assembly including the cathode and the anode and the separator 200, thus forming a single unit cell.

Figure 4:
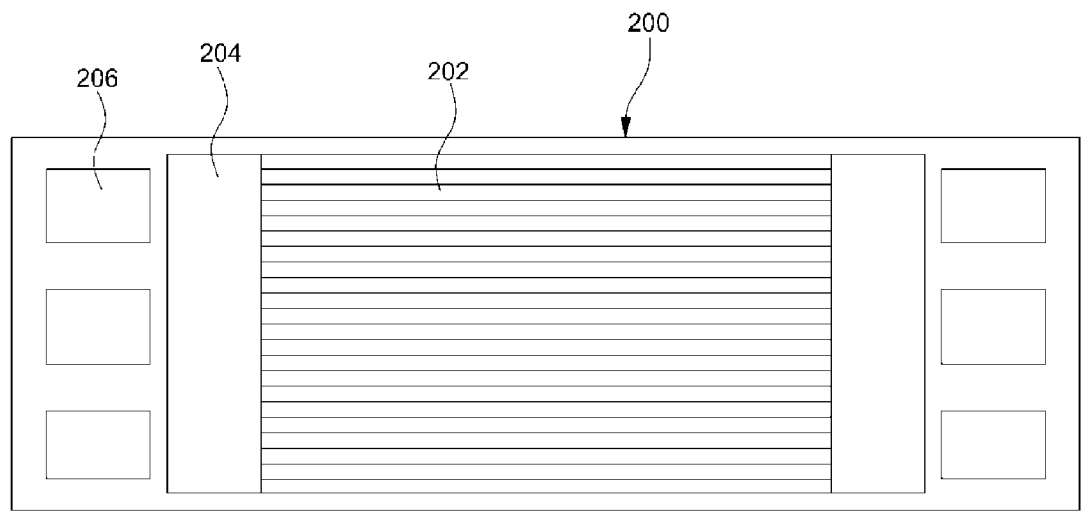
FIG. 4 is a front view showing the structure of a separator for implementing a fuel cell with a porous material-gasket integrated structure according to an embodiment of the present invention.

To this end, the separator 200 can be configured with a porous material-receiving portion 204 such that the porous material-gasket integrated structure 100 can be easily stacked on the separator 200. In particular, as shown in FIG. 4, the separator 200 can be provided with a structure in which a plurality of manifolds 206 are formed on both sides thereof, such that the plurality manifolds 206 line up with and can be connected to the manifolds 112 of the porous material-gasket integrated structure 100. The separator 200 can further include the reaction flow field 202, in which channels and lands are repeated, disposed in the middle thereof, and the porous material-receiving portion 204 formed between the manifolds 206 and the reaction flow field 202.

Here, the reaction flow field 202 of the separator 200 does not requires a distribution flow field in the form of an oblique line or stream line due to the porous material 120 received in the porous material-receiving portion 204. As such, the distribution flow field can be simply formed as a straight flow field, which make it possible to reduce the occurrence of defects due to the simplification of the molded structure of the separator, to reduce the manufacturing cost and improve the productivity due to the simplification of the mold structure, and to reduce the occurrence of deformation after molding due to the absence of rapid deformation of the separator.

Figure 5:
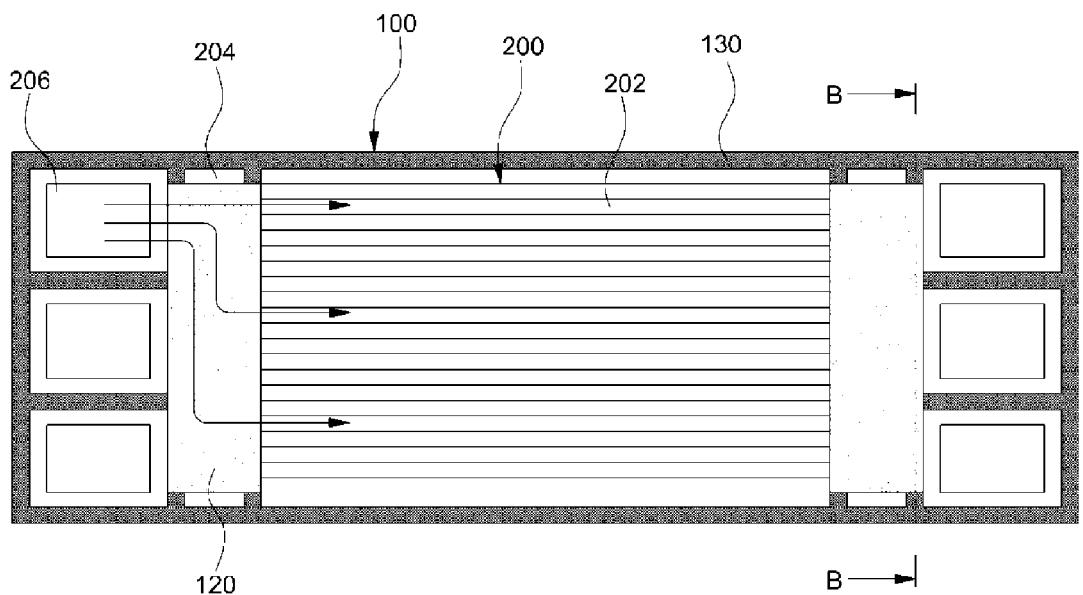
FIG. 5 is a front view showing a structure in which a porous material-gasket integrated structure and a separator are stacked according to an embodiment of the present invention.
Figure 6:
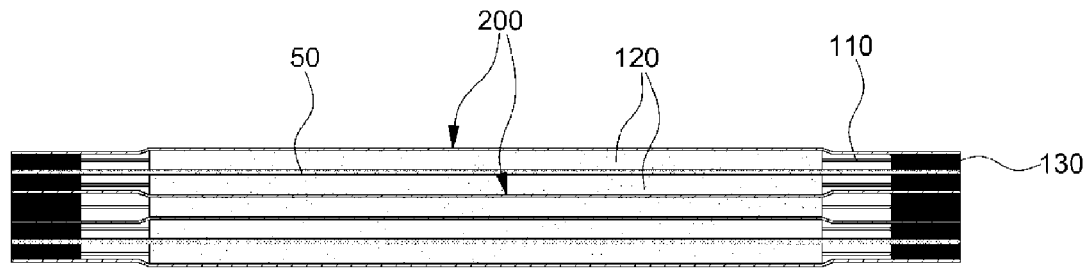
FIG. 6 is a cross-sectional view taken along line B-B of FIG. 5 and showing that several cells are stacked.
Figure 7:
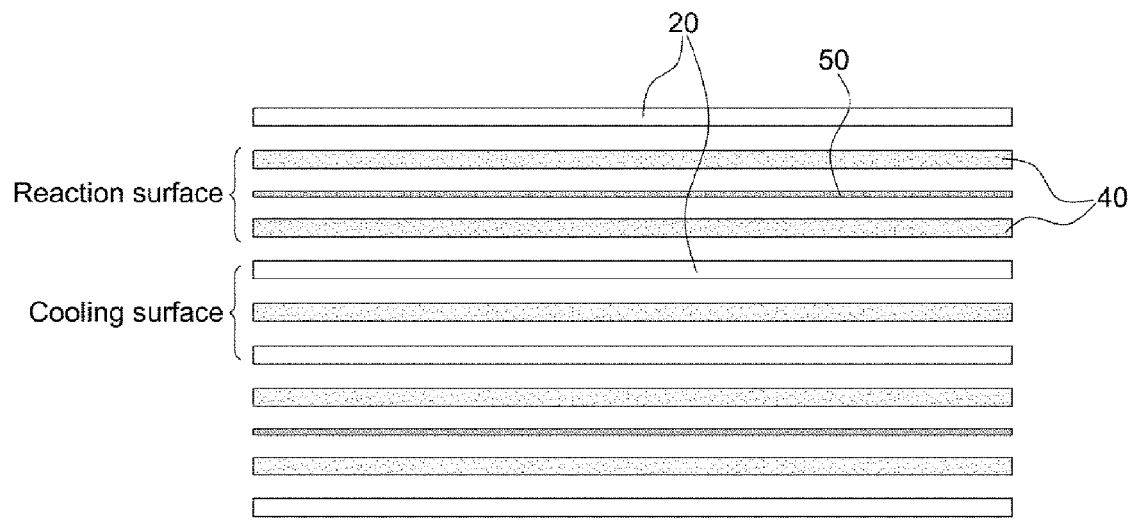
FIG. 7 is a schematic diagram showing the structure a fuel cell in which a conventional porous material is employed.
Figure 8:
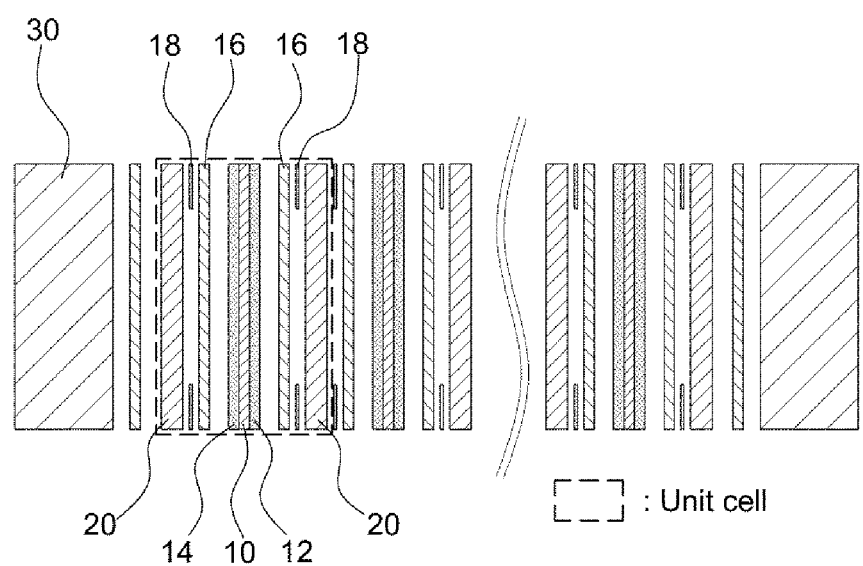
FIG. 8 is a schematic diagram showing the configuration of a unit cell of a typical fuel cell stack.

Accordingly, as shown in FIGS. 5 and 6, one side of the porous material-gasket integrated structure 100 is stacked on the separator 200 such that the porous material 120 is closely received on the porous material-receiving portion 204 of the separator 200, the gasket 130 is in close contact with the outer four edges of the separator 200 and the edges of the manifolds 206, thus maintaining gas tightness.

The other side of the porous material-gasket integrated structure 100 is further stacked on the cathode or anode side of the membrane electrode assembly 50.

As a result, as shown in FIG. 5, the porous material 120 is located between the manifold 206 of the separator 200, through which gas is supplied, and the reaction flow field 202 where an electrochemical reaction takes place. As such, the gas (air or hydrogen) fed through the manifold can easily diffuse toward the reaction flow field 202.

According to various embodiments, either gas or water diffuses through the porous material 120, and the other of the two (water or gas) is blocked by the sealing material 122 formed on the upper and lower sides of the porous material 120 and the outer surfaces.

As described above, the present invention provides the following effects.

The porous material-gasket integrated structure 100, in which the porous material and the gasket 130 are integrally molded on the thin frame 110, is stacked on the separator 200 such that the porous material is located between the manifold 112, through which gas is supplied, and the reaction flow field 202, where an electrochemical reaction takes place, so as to serve as a diffuser for gas fed through the manifold. As a result, it is possible to facilitate the flow of gas and water by the porous material and to prevent the occurrence of flooding in the reaction surface, thus improving the performance of the fuel cell.

Moreover, since the porous material is integrally formed with the gasket 130, it is possible to reduce the number of unit cells of the fuel cell stack, to reduce the overall length of the fuel cell stack, and to reduce the overall volume of the fuel cell stack.

Furthermore, since the porous material is provided locally between the manifold 112, through which gas is supplied, and the reaction surface where the electrochemical reaction takes place, it is possible to improve the heat transfer efficiency for transferring heat to the exterior or the fuel cell during heat dissipation, thus preventing the fuel cell stack from deteriorating due to overheating.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell with a porous material-gasket integrated structure, the fuel cell comprising:
   a porous material-gasket integrated structure including a thin frame having a plurality of manifolds formed on opposing sides thereof, a porous material integrally molded adjacent to the plurality of manifolds of the thin frame, and a gasket integrally molded on the thin frame;
   a separator including a porous material-receiving portion in which the porous material-gasket integrated structure is stacked; and
   a sealing material integrally formed on upper and lower sides of the porous material and on an outer surface adjacent to the plurality of manifolds, wherein the sealing material is formed on the outer surface adjacent to the plurality of manifolds except a region in contact with one of the plurality of manifolds,
   wherein the porous material is integrally formed between the plurality of manifolds and a reaction surface area of the thin frame,
   the porous material has a porous structure, and
   the sealing material has a dense metallic plate structure without pores.

2. The fuel cell of claim 1, wherein the thin frame further includes porous material support frames integrally formed adjacent to the inner side of the plurality of manifolds.

3. The fuel cell of claim 1, wherein the porous material of the porous material-gasket integrated structure is integrally molded adjacent to the inner side of the plurality of manifolds of the thin frame.

4. The fuel cell of claim 2, wherein the porous material of the porous material-gasket integrated structure is integrally molded adjacent to the inside of the plurality of manifolds of the thin frame.

5. The fuel cell of claim 1, wherein the porous material of the porous material-gasket integrated structure is integrally formed to surround a manifold inner frame and porous material support frames of the thin frame.

6. The fuel cell of claim 2, wherein the porous material of the porous material-gasket integrated structure is integrally formed to surround a manifold inner frame and the porous material support frames of the thin frame.

7. The fuel cell of claim 1, wherein the plurality of manifolds include a hydrogen manifold, an air manifold and a coolant manifold, and the sealing material is formed on the outer surface of the porous material adjacent to the plurality of manifolds except along the hydrogen manifold.

8. The fuel cell of claim 1, wherein the plurality of manifolds include a hydrogen manifold, an air manifold and a coolant manifold, and the sealing material is formed on the outer surface of the porous material adjacent to the plurality of manifolds except along the air manifold.

9. The fuel cell of claim 1, wherein the plurality of manifolds include a hydrogen manifold, an air manifold and a coolant manifold, and the sealing material is formed on the outer surface of the porous material adjacent to the plurality of manifolds except along the coolant manifold.

10. The fuel cell of claim 1, wherein the thin frame and the porous material are made of the same metal and are integrally molded.

11. The fuel cell of claim 1, wherein the thin frame comprises a plurality of through-holes for injection molding of the gasket.

12. The fuel cell of claim 1, wherein the gasket is injection-molded to surround front and rear sides of the thin frame and has a predetermined thickness, and the gasket is connected thereto through the through-holes.

13. The fuel cell of claim 11, wherein the gasket is injection-molded to surround front and rear sides of the thin frame and has a predetermined thickness, and the gasket is connected thereto through the through-holes.

14. The fuel cell of claim 1, wherein the separator comprises a plurality of manifolds formed on opposing sides thereof, a porous material-receiving portion formed between the plurality of manifolds of the separator, and a reaction flow field formed in the middle thereof.

15. The fuel cell of claim 14, wherein the reaction flow field in the porous material-receiving portion is formed as a straight flow field.

* * * * *